July 4, 1967 G. E. AUSTIN ET AL 3,329,532
RADIOISOTOPE HEATED THRUSTER AND GENERATOR
Filed June 3, 1964
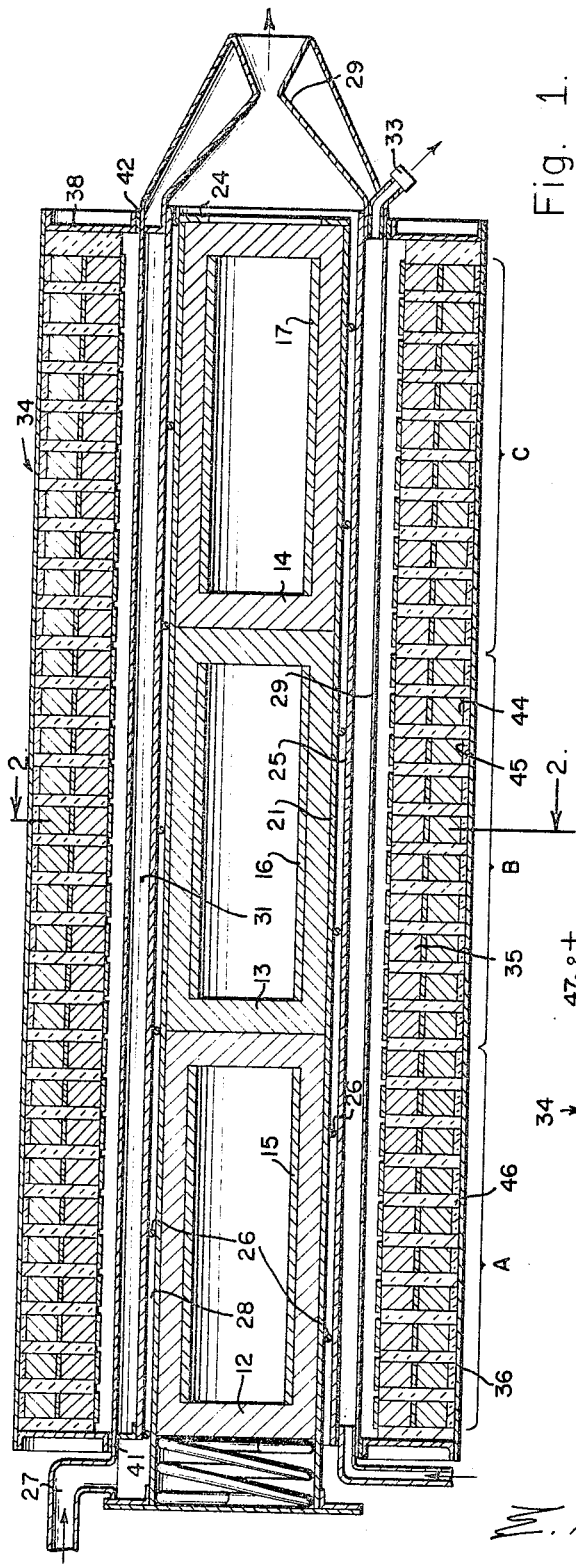
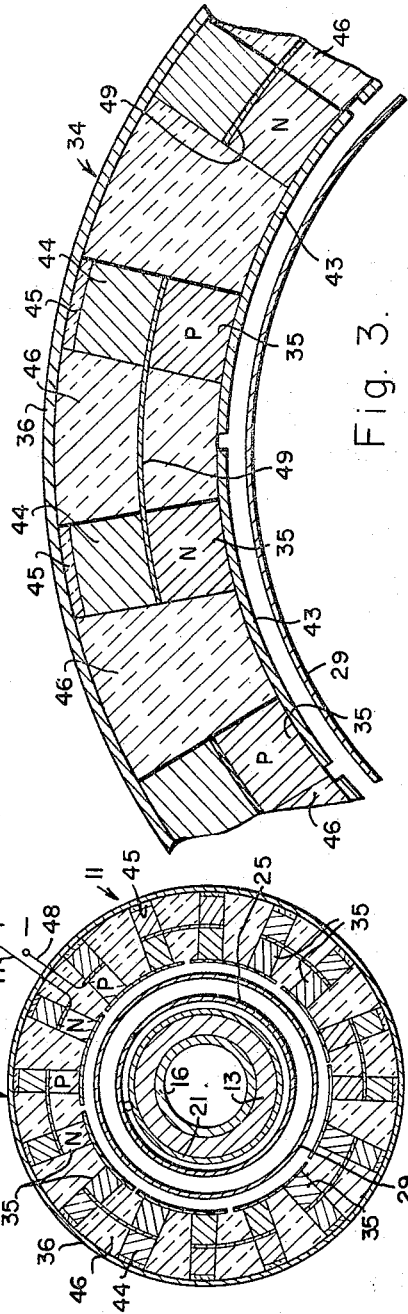
George E. Austin,
Robert W. Bussard,
INVENTORS.
BY.
E. Hayward Marshall
AGENT.

United States Patent Office 3,329,532
Patented July 4, 1967

3,329,532
RADIOISOTOPE HEATED THRUSTER AND
GENERATOR
George E. Austin, Rolling Hills Estates, and Robert W. Bussard, Palos Verdes Estates, Calif., assignors to TRW Inc., a corporation of Ohio
Filed June 3, 1964, Ser. No. 372,342
1 Claim. (Cl. 136—202)

This invention relates to a radioisotope heated thruster and generator, wherein a common radioisotope heat source is utilized to provide energy for both propulsion and electrical power.

A copending application for a Direct Cycle Radioisotope Rocket Engine, Ser. No. 243,140, filed Dec. 7, 1962, discloses a direct cycle low thrust rocket engine, which employs an encapsulated radioisotope to heat a working fluid and then expels the hot gas through a nozzle to provide a high specific impulse with a low specific weight for the propulsion system. Radioisotope heat sources have also been utilized with appropriate thermoelectric energy converters of various kinds for converting heat into electric energy. In the present invention, a single radioisotope source is suitably harnessed to provide both thrust and power. Integration of these two functions results in a simple, composite thruster-generator featuring reliability, performance, weight, and cost advantages. No increase in the size of the heat source necessary for the propulsion function alone is required, yet no significant degradation in propulsion performance results.

One preferred embodiment of the present invention consists essentially of a cylindrical radioisotope-fueled thruster/heat source of the type described in the above referenced application (Ser. No. 243,140) enshrouded by a thermoelectric energy converter. The very high temperature source (1500° C. and above) required for an effective, high specific impulse thruster is exploited for power production by using a converter which operates at correspondingly high temperature, resulting in small geometry and low weight. A variety of thermoelectric conversion materials could be used as well as other types of heat-to-electrical energy converters, including thermionic converters and electromechanical converters utilizing a working fluid to drive turbo-generators.

The integration of thrust and power functions in this unique combined device is accomplished so as to produce partial electrical output while thrusting, without compromising specific impulse, and maximum electrical output upon termination of thrust when the propellant has been expended.

In the one preferred embodiment of the invention, as illustrated herein, a fluid passage for flow of propellant is provided adjacent to the radioisotope heat source housing. The propellant flows from an inlet at one end of the passage, through a helical guide, and out through a nozzle at the outlet end to provide thrust. A cylindrical radiator is mounted in concentric spaced relation to the outer shell of the housing and is provided with a plurality of interconnected thermoelectric elements mounted on the radiator and extending inwardly with their inner ends in contiguous spaced relation to the outer shell. The thermoelectric elements preferably consist of alternate P and N type germanium-silicon semiconductors with the inner ends of each P and N couple being electrically connected by the receptor, and adjacent couples being electrically connected by a strap at the outer, cold end. Each of the thermoelectric elements is attached to a metal standoff and an electrical insulator for mounting to the radiator. The thermoelectric elements are preferably arranged in annular rings appropriately interconnected in series-parallel arrangements. A number of different types of thermoelectric converters may be utilized, and two or more different types may be combined in a plurality of concentric arrangements around the thruster with each type operating at its optimum temperature range. Obviously many other structural arrangements may be utilized than the one illustrated in the present application for implementing the basic concept of the present invention.

One object of the present invention is to make continuing use of the thermal power available from a radioisotope-fueled thruster after the thrusting function terminates upon propellant exhaustion, by converting otherwise wasted post-thrust residual energy into electrical energy.

Another object of the present invention is to provide an electrical power source which is self-contained within the radioisotope thruster, which source will operate vehicular subsystems during the prolonged propulsion period characteristic of such thrusters, eliminating the necessity for a separate power supply.

A further object of the present invention is to effect weight and cost economies, and to achieve reliability and long operating life time, by combining thruster and generator functions in a simple, ruggedly constructed single device with desirable power-to-weight ratio.

A still further object of the present invention is to provide a device which functions as a thruster and generator without significantly compromising the performance which would be expected of a thruster alone or a generator alone with the same heat source strength.

A still further object is to provide capability for continuing or intermittent thrust at a very low level for station keeping, attitude control, or other purposes, without interfering with electrical power generation, by means of a storable propellant bled through the same passage used during the primary thrust phase, but for reduced flow rates and durations.

Other objects and many of the attendant advantages of this invention will be readily appreciated as the same becomes better understood by reference to the following detailed description when considered in connection with the accompanying drawings wherein:

FIG. 1 is a longitudinal sectional view of one preferred embodiment of the radioisotope heated thruster-generator of the present invention;

FIG. 2 is a cross-sectional view taken on the line 2—2 of FIG. 1;

FIG. 3 is an enlarged fragmentary view in section, illustrating the construction and arrangement of the thermoelectric elements in more detail.

Referring now to the drawings in detail, and more particularly to FIGS. 1 and 2, the combined radioisotope thruster generator 11 is provided with a radioisotope heat source which may consist of a plurality of capsules, such as the capsules 12, 13 and 14 shown in FIG. 1.

In one preferred form of the invention, the radioisotope heat source is polonium 210, although other radioisotopes may be utilized, and with this particular form of fuel, it is desirable to provide a central void to contain the helium gas generated during decay of the radioisotope. Therefore the radioisotope heat source has been shown as a plurality of thin cylindrical shells 15, 16, and 17 inside of the capsules 12, 13, and 14.

The radioisotope capsules 12, 13, and 14 are preferably fabricated of a tungsten alloy with tantalum inner liners or coatings, which resist oxidation and protect the surfaces of the tungsten capsules. Since this coating would be very thin, it has not been delineated and indicated by a numeral in the drawings.

The capsules 12, 13 and 14 are retained within the cylindrical sleeve 21 by a spring 22, which is held in position by the end plate 23, together with the annular ring 24 at the opposite end of the cylindrical shell 21.

The cylindrical shell 21 is spaced from the shell 25 by a spirally-wound tungsten wire helix 26 which forms a helical flowguide for the propellant to prevent any laminar flow instability and to distribute the isotope heat to both the inner and outer flow passage walls. This allows more efficient heat transfer to the working fluid via the larger surface area.

The hydrogen or any other desired propellant is introduced through the inlet tube 27 to the spiral passage 28 formed by the wire helix 26 and passes out through a convergent-divergent nozzle 29 which expands the hot hydrogen, thus developing propulsive thrust.

The thruster housing surrounding the radioisotope heat source consists of the two cylindrical shells 21 and 25 which form the fluid passage for the flow of propellant adjacent to the heat source, and also includes an outer shell 29 which forms an annular fluid passage 31 for a cooling fluid such as water, which may be required prior to and during launch to prevent overheating. The cooling fluid may be introduced through an inlet line 32 and vented at the opposite end of the fluid passage through a relief-valve 33.

The outer shell 29 of the thruster acts as the coolant jacket and also as a thermal shield to obtain the desired stepdown in temperature between propellant flow wall and converter receptor surfaces. The emissivity of these interface surfaces is adjusted or additional shields are used to achieve optimum temperature profiles.

The thruster is enshrouded by the thermoelectric converter 34 which consists of the plurality of thermoelectric elements 35 of conventional construction. These elements 35 are mounted on an outer cylindrical radiator 36 which is supported by annular rings 37 and 38 at its opposite ends on the outer shell 29. Thermal insulating rings 41 and 42 are preferably positioned between the rings 37 and 38 and the cylnidrical outer shell 29 of the thruster.

The thermoelectric elements 35 are cantilevered or extend inwardly from the radiator 36 with their hot ends terminating in individual heat receptors 43 which receive the heat radiated or dissipated by the outer shell 29 and interconnect the P and N thermocouple. Each of the thermoelectric elements 35 is preferably attached to a metal standoff 44 and an electrical insulator 45 for mounting on the radiator 36.

These thermoelectric elements 35 may consist of alternate P and N type germanium-silicon semiconductors with the inner ends of each P and N couple being connected electrically by the receptor 43 and adjacent couples being connected by connector strap 49.

In the particular arrangement shown, coupling across the thruster/converter interface is radiative. The thermoelectric elements are cantilevered inward from the radiator 36, with their hot ends terminating in individual heat receptors 43. The opposite arrangement would be used for direct, conductive coupling, with cold ends terminating in individual radiator segments. Radiative coupling results in a clean interface between thruster and converter, with physical contact necessary only for structural support. With this configuration, temperatures desired on each side of the interface can be attained by emissivity adjustments, and stress is minimized at hot junction bonds. The choice between radiative and direct coupling will be determined by the strength and operating temperature of the particular materials selected.

Thermal insulation 46 is emplaced between the thermoelectric elements 35, as indicated in FIGS. 2 and 3, to minimize thermal shunt losses. The metal standoffs 44 complete the thermal paths to the radiator which may be finned to achieve lower rejection temperature. Optionally, standoffs may be eliminated at the expense of a smaller radiator, larger internal gap between shield 29 and receptor 43, or by using longer thermoelectric elements 35 with nonoptimum length to area ratios.

Thermal control to prevent overheating of the internal fuel elements is accomplished passively. Heat energy during the thrust is partitioned so that approximtaely one-half passes through the converter while one-half is transferred to the propellant. The change from flow to no-flow conditions involves only a doubling of the heat flux which must pass through the converter. This additional radial heat flux is accommodated by a temperature increase in the colder, forward section of the thruster, with no appreciable change in its maximum temperature at the exit end. Thus, the present invention is characterized by a simple and safe thermal control mechanism, involving negligible compromise of specific impulse.

In FIG. 2, the thermoelectric elements 35 in any annular ring are shown to be connected in series. In order to prevent one element, which may fail in the open condition, from negating all other elements in series with it, series-parallel interconnections are necessary. These may be introduced in a number of ways, depending upon reliability and voltage objectives. One such configuration involves a pairing of rings so that the elements within each ring are series-connected as shown, and cross connections are made between adjacent elements in each of the two rings. A plurality of pairs of rings so formed are then connected in series to form a section. Each section terminates in positive and negative output leads 47 and 48 which may be connected to various loads independently, or connected in series or parallel to a single load. The optimum number of sections is related to the axial temperature profile during propellant flow, and has been indicated in FIG. 1 as sections A, B, and C. This number is taken to be three, since the last third or section C of the shield surface 29 radiating to the receptors 43 has a temperature which is reasonably constant in the axial direction and which is not appreciably different from its no-flow value. This is a particularly important characteristic of the device, in that it permits electrical power to be extracted from the end section at near-optimum conditions whether or not propellant is flowing. For certain missions, it may be desirable to have only the on section C, which would reduce the over-all weight and would provide substantially the same amount of power during flow and no-flow operation.

In order to indicate the general size and performance of a combined thruster-generator, a polonium 210 fueled device is chosen for illustrative purposes. The chemical form of the fuel permits it to be used at temperatures up to 1500° C. Its initial strength is taken to be 5 kilowatts. Over-all length of the illustrative device is approximately 17 inches, the heated portion of which is 14 inches. The diameter of the shield 29 (interface between thruster and generator) is 2.86 inches, and the diameter of the radiator 34 is 5.25 inches. The thruster/heat source portion of the device weighs about 30 pounds and delivers up to 0.25 lb. of thrust, with hydrogen as the propellant, at a specific impulse of 700 seconds. Higher fuel temperatures will permit higher specific impulses. The converter portion of the device adds 16 pounds to the total weight. At initial fuel strength, and with no propellant flowing, hot and cold junction temperatures are taken to be 1300° K. and 900° G., respectively. The over-all efficiency of the converter under these initial conditions is about 4%. Electrical power output of the device with no propellant flowing is tabulated below for the initial heat source strength (5 kw.), for its strength 138 days or one half life later (2.5 kw.), and for one intermediate strength (3.75 kw.). When propellant is flowing in the system, the electrical output may be taken to be one-third of the power extracted under no-flow conditions.

| | | | |
|---|---|---|---|
| Heat Source Strength, kw | 5.0 | 3.75 | 2.50 |
| No-Flow Power Output, watts | 208 | 142 | 66 |

While the preferred embodiment illustrated in the present application shows only one converter stage, the high temperatures at which the thruster operates permits staging several such converters optimized for several different temperature ranges and successively enveloping each other. Multiple thermionic and thermoelectric converters can be installed as successive sleeves around a single thruster, the input to each stage being the heat rejected by the sleeve immediately within it. The electrical outputs of each stage can be used additively or independently.

Another possible design variation involves multiple channels for the flow of propellant, such that the propellant is preheated by passage first externally around the outside of the converter, absorbing thermal energy which would otherwise be radiated to space, and then is guided through internal channels as depicted in FIG. 1. In this way, some of the heat rejected by the converter is put to use.

The converter can be used as a thermal switch or variable insulator to provide some measure of thermal control. Variation of the load across the converter varies its effective thermal "transparency" by an appreciable factor. By designing for maximum allowable internal temperatures with no propellant flowing and full electrical load connected, the decrease in propellant flow channel wall temperatures during flow can be reduced, or the thrust corresponding to a given specific impulse increased, by disconnecting the load. For applications not requiring electrical output during thrust, this feature improves thruster performance while permitting the converter to be fixed in position for post-thrust use.

Obviously materials capable of withstanding extremely high temperatures such as tungsten and tantalum are preferably utilized throughout the structural portions of the present invention. However, other materials which may be developed to withstand higher temperatures would further increase the efficiency and usefulness of the combined radioisotope heated thruster and generator.

Obviously many other modifications and variations of the present invention may be made within the scope of the following claim.

The embodiments of the invention in which an exclusive property or privilege is claimed are defined as follows:

A radioisotope heated thruster and generator comprising:

(A) a radioisotope heat source;
(B) a housing surrounding said heat source and providing a fluid passage for flow of propellant adjacent said heat source, said housing having a propellant inlet to one end of said passage, said housing including a cylindrical outer shell;
(C) a nozzle receiving the heated propellant from an outlet end of said passage;
(D) a cylindrical radiator mounted in concentric spaced relation to said outer shell, a plurality of interconnected thermoelectric elements mounted on said radiator and extending inwardly with their inner ends in contiguous spaced relation to said outer shell;
(E) said thermoelectric elements comprising alternate P and N type semiconductors with the inner ends of each P and N couple being connected by a receptor strap and adjacent couples being connected by a connector strap, each of said thermoelectric elements being attached to a metal standoff and an electrical insulator for mounting on said radiator.

References Cited

UNITED STATES PATENTS

| | | | |
|---|---|---|---|
| Re. 25,242 | 9/1962 | Toulmin | 136—4 |
| 2,998,550 | 8/1961 | Collins et al. | 310—3 |
| 3,081,365 | 3/1963 | Henderson et al. | 136—4 |
| 3,087,451 | 4/1963 | Chandler | 60—35.5 X |
| 3,160,568 | 12/1964 | Mac Farlane | 176—39 X |
| 3,184,915 | 5/1965 | Low et al. | 60—35.5 |
| 3,189,765 | 6/1965 | Danko et al. | 136—4 X |

FOREIGN PATENTS

| | | |
|---|---|---|
| 841,613 | 6/1952 | Germany. |
| 598,774 | 2/1948 | Great Britain. |
| 738,511 | 10/1955 | Great Britain. |
| 874,660 | 8/1961 | Great Britain. |

CARLTON R. CROYLE, *Primary Examiner.*